(12) United States Patent
Umur et al.

(10) Patent No.: US 10,376,820 B2
(45) Date of Patent: *Aug. 13, 2019

(54) REMOVING SOLIDS FROM A FLOWING FLUID USING A CARE-FREE PUMPED OR GRAVITY FLOW ROTATING DRUM SCREEN WITH STATIONARY STABILIZATION ASSEMBLIES

(71) Applicant: Parkson Corporation, Fort Lauderdale, FL (US)

(72) Inventors: Serdar Umur, Chicago, IL (US); Walter Stanek, Memphis, TN (US); David Mitchell, Wilmette, IL (US)

(73) Assignee: PARKSON CORPORATION, Ft. Lauderdale, FL (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/467,842

(22) Filed: Mar. 23, 2017

(65) Prior Publication Data

US 2017/0252680 A1    Sep. 7, 2017

Related U.S. Application Data

(63) Continuation of application No. 13/799,977, filed on Mar. 13, 2013, now Pat. No. 9,616,366.

(Continued)

(51) Int. Cl.
*B01D 33/00* (2006.01)
*B01D 33/11* (2006.01)
(Continued)

(52) U.S. Cl.
CPC ..... *B01D 33/0035* (2013.01); *B01D 33/0009* (2013.01); *B01D 33/11* (2013.01); *B01D 33/801* (2013.01)

(58) Field of Classification Search
USPC ....... 209/243, 247, 270–274, 284, 288, 293, 209/294, 380, 393
See application file for complete search history.

(56) References Cited

U.S. PATENT DOCUMENTS 2,212,168 A   8/1940   Peterson
2,664,204 A   12/1953  Hurter
(Continued)

OTHER PUBLICATIONS

Definition of Flange (2 pages; accessed online Sep. 12, 2014).
(Continued)

*Primary Examiner* — Hayden Brewster
(74) *Attorney, Agent, or Firm* — Gilberto M. Villacorta; Kira Lee Sharon; Foley & Lardner LLP

(57) ABSTRACT

A pumped or gravity flow rotating drum screen removes unwanted solids from a flowing fluid. The drum screen may comprise: a housing having a fluid inlet end, a solid discharge end and an area between the two ends, the fluid inlet permitting a flow of influent containing unwanted solids into a hollow portion of a drum screen positioned lengthwise in the area between the two ends of the housing, the screen comprising a filter medium that retains at least a portion of the unwanted solids within the hollow portion of the drum screen and which produces a liquid effluent that is discharged from an outer surface of the drum screen, the retained solids being removable via the solid discharge end; a drive assembly configured to rotate the drum screen about an axis running the length of the drum screen; and one or more stabilization pad assemblies in contact with one or more rings circumscribing the outer surface of the drum screen at one or more locations.

18 Claims, 14 Drawing Sheets

Related U.S. Application Data

(60) Provisional application No. 61/612,156, filed on Mar. 16, 2012.

(51) Int. Cl.
    *B01D 33/80*     (2006.01)
    *B01D 15/00*     (2006.01)

(56) References Cited

U.S. PATENT DOCUMENTS

| | | |
|---|---|---|
| 3,783,918 A | 1/1974 | Simpson et al. |
| 4,448,301 A | 5/1984 | Alger |
| 4,492,415 A | 1/1985 | Baile et al. |
| 5,200,050 A | 4/1993 | Ivory et al. |
| 5,607,587 A | 3/1997 | Langner |
| 6,109,450 A | 8/2000 | Grunenwald et al. |
| 6,126,207 A | 10/2000 | Ives |
| 6,227,379 B1 | 5/2001 | Nesseth |
| 2002/0068659 A1 | 6/2002 | Hirai et al. |
| 2005/0072870 A1 | 4/2005 | Dziesinski et al. |
| 2006/0180533 A1 | 8/2006 | Cummins |
| 2008/0035584 A1 | 2/2008 | Petit et al. |

OTHER PUBLICATIONS

Bearings Insert Definition (2010 & 2011; 4 pages).
Flange Mounted Bearings—Definitions (3 pages; 2010 & 2012).
Corrosion and Corrosion Properties of Stainless Steels (Feb. 2011; 3 pages).
Gideon (Nickel as a Coating Material, 34 (Oct. 2011), 2 pages.

Fig. 11
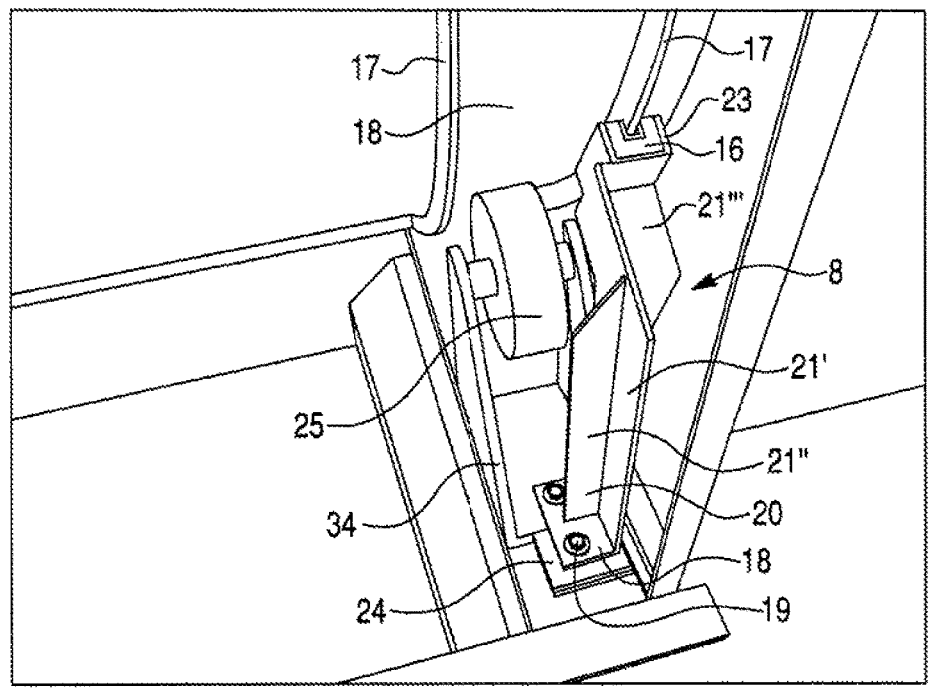
Fig. 12 – PRIOR ART
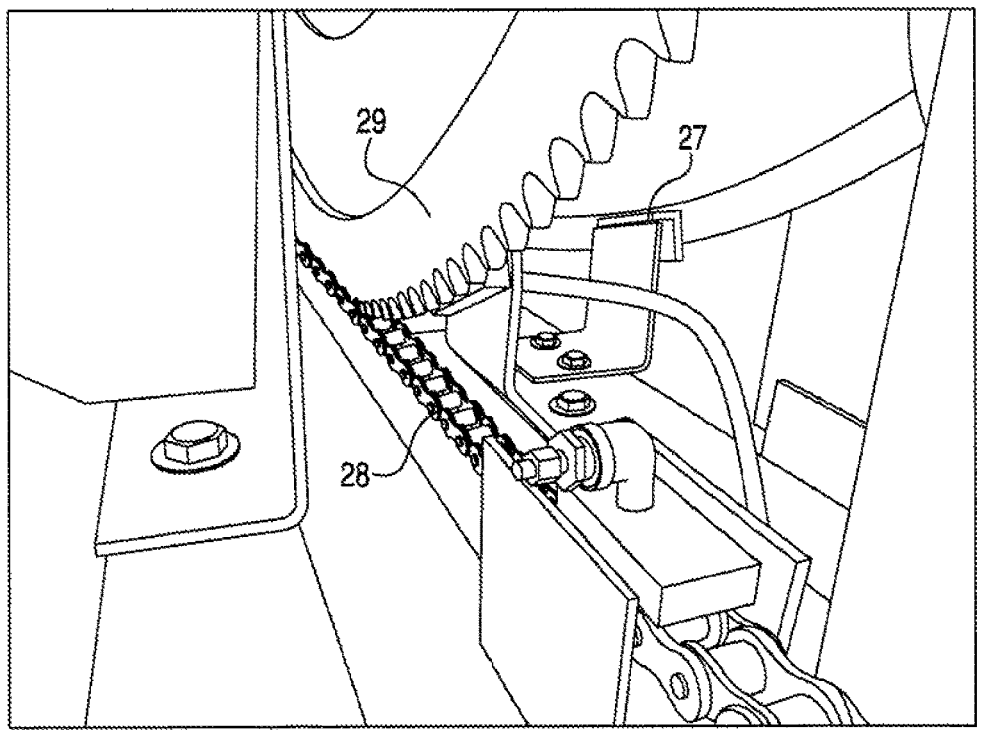

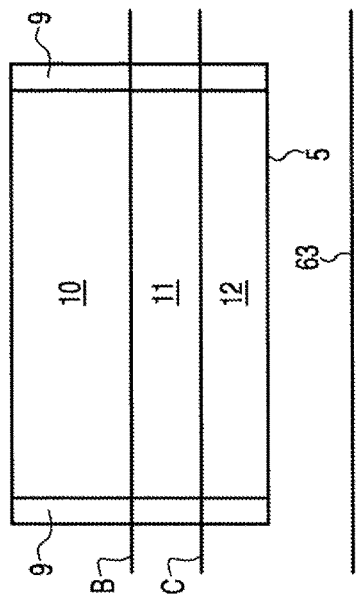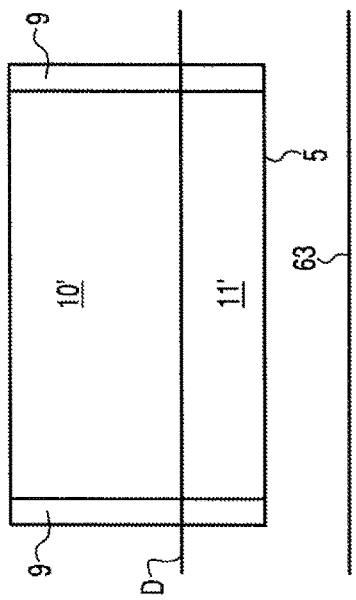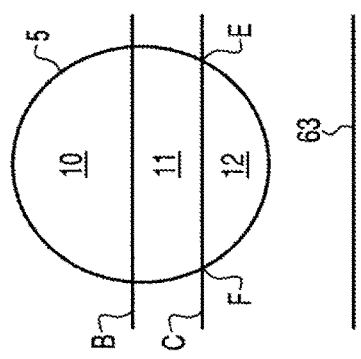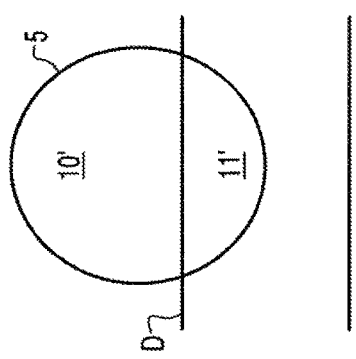

US 10,376,820 B2

REMOVING SOLIDS FROM A FLOWING FLUID USING A CARE-FREE PUMPED OR GRAVITY FLOW ROTATING DRUM SCREEN WITH STATIONARY STABILIZATION ASSEMBLIES

CROSS-REFERENCE TO RELATED PATENT APPLICATIONS

This application is a continuation of U.S. patent application Ser. No. 13/799,977, filed on Mar. 13, 2013, which claims priority from U.S. Provisional Patent Application No. 61/612,156, filed Mar. 16, 2012. The contents of these applications are incorporated herein by reference in their entirety.

BACKGROUND

The present invention relates to a pumped or gravity flow rotating drum screen for removing unwanted solids from a flowing fluid having one or more stabilization pad assemblies in contact with one or more rings circumscribing the outer surface of the drum screen at one or more locations.

Rotating drum screens are known for use in many solid-liquid separation applications including (but not limited to) the industries of pulp and paper, municipal sewage treatment, meat and poultry, citrus fruit, seafood, and other food processing, beverage processing, plastic recycling, and chemical processing.

SUMMARY

According to one embodiment of the present invention, a pumped or gravity flow rotating drum screen for removing unwanted solids from a flowing fluid may comprise a housing having a fluid inlet end, a solid discharge end and an area between the two ends, the fluid inlet permitting a flow of influent containing unwanted solids into a hollow portion of a drum screen positioned lengthwise in the area between the two ends of the housing, the screen comprising a filter medium that retains at least a portion of the unwanted solids within the hollow portion of the drum screen and which produces a liquid effluent that is discharged from an outer surface of the drum screen, the retained solids being removable via the solid discharge end; a drive assembly configured to rotate the drum screen about an axis running the length of the drum screen; and one or more stabilization pad assemblies in contact with one or more rings circumscribing the outer surface of the drum screen at one or more locations substantially removed from the bottom most portion of the drum screen.

According to another embodiment of the present invention, a pumped or gravity flow rotating drum screen for removing unwanted solids from a flowing fluid may comprise a housing having a fluid inlet end, a solid discharge end and an area between the two ends, the fluid inlet permitting a flow of influent containing unwanted solids into a hollow portion of a drum screen positioned lengthwise in the area between the two ends of the housing, the screen comprising a filter medium that retains at least a portion of the unwanted solids within the hollow portion of the drum screen and which produces a liquid effluent that is discharged from an outer surface of the drum screen, the retained solids being removable via the solid discharge end; a drive assembly configured to rotate the drum screen about an axis running the length of the drum screen; and one or more stabilization pad assemblies in contact with one or more rings circumscribing the outer surface of the drum screen at one or more locations in an area of the discharge end.

It is to be understood that both the foregoing general description and the following detailed descriptions are exemplary and explanatory only, and are not restrictive of the invention as claimed.

BRIEF DESCRIPTION OF THE DRAWINGS

The features, aspects, and advantages of the present invention will become apparent from the description, appended claims, and the accompanying exemplary embodiments shown in the drawings, which are briefly described below.

FIGS. 10-11 are views of a stabilization pad assembly and a trunnion wheel according to one embodiment of the present invention.

FIG. 12 is a view of a stabilization pad assembly.

FIG. 18a through FIG. 18d are front and side schematic views, respectively, of the drum screen, including a depiction of horizontal planes that divide the drum screen into two or more portions of equal or unequal volumes, according to an embodiment of the present invention.

DETAILED DESCRIPTION

Various embodiments of the present invention will be explained with reference to the accompanying drawings.

Figure 1:
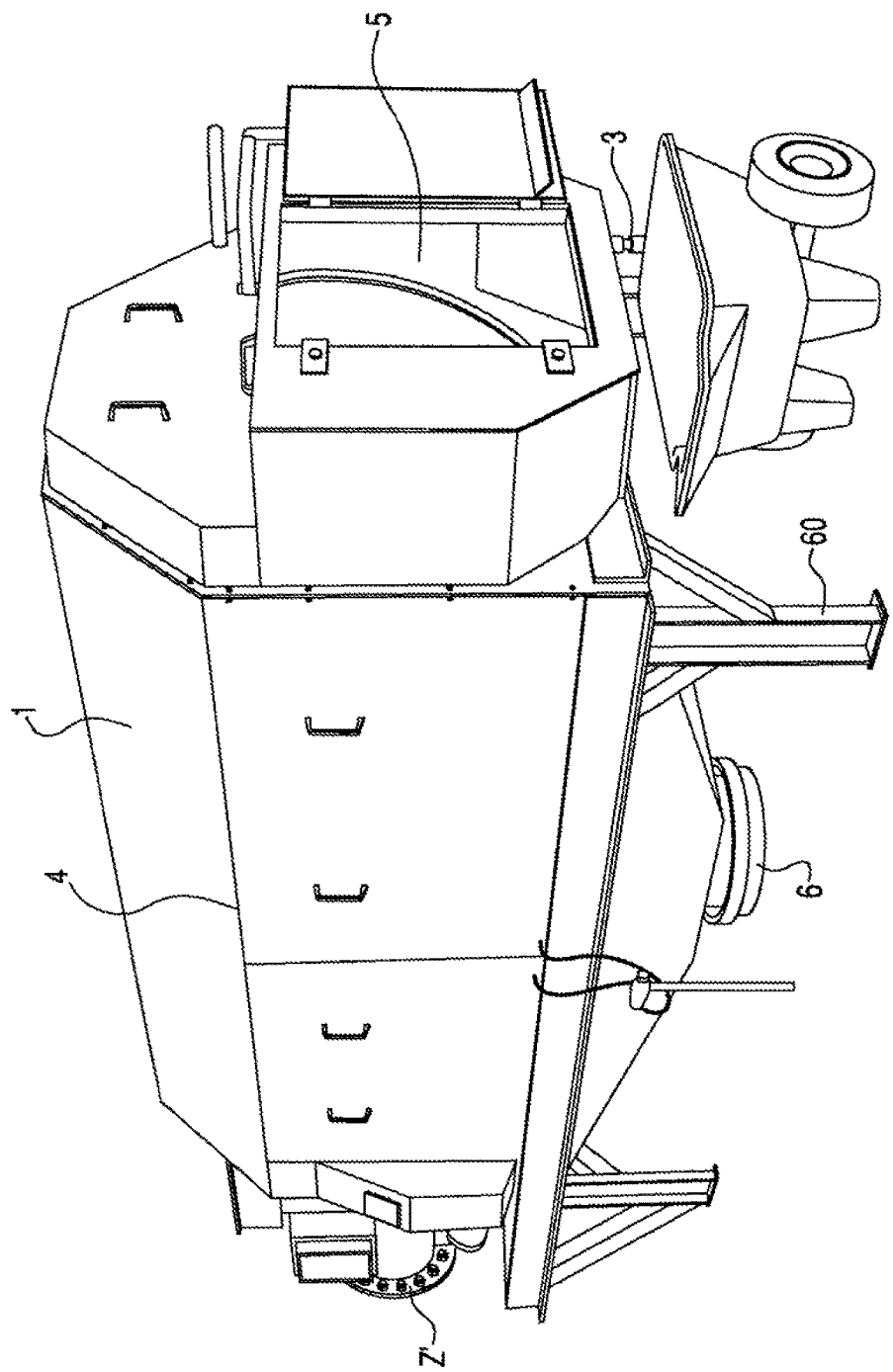
FIG. 1 is a discharge end view of a pumped or gravity flow rotating drum screen according to an embodiment of the present invention.
Figure 2:
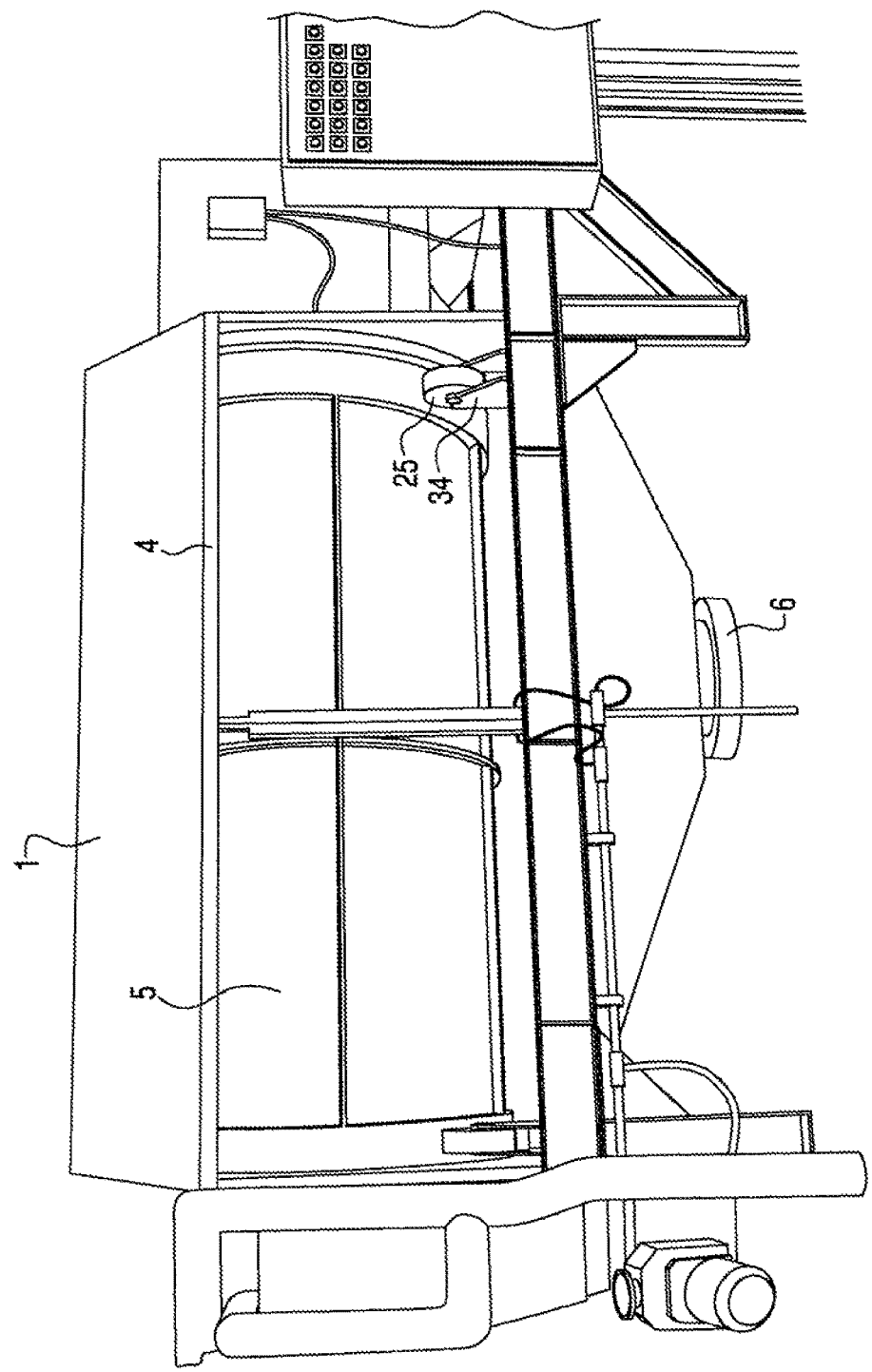
FIG. 2 is a side end view of the pumped or gravity flow rotating drum screen of FIG. 1.
Figure 9:
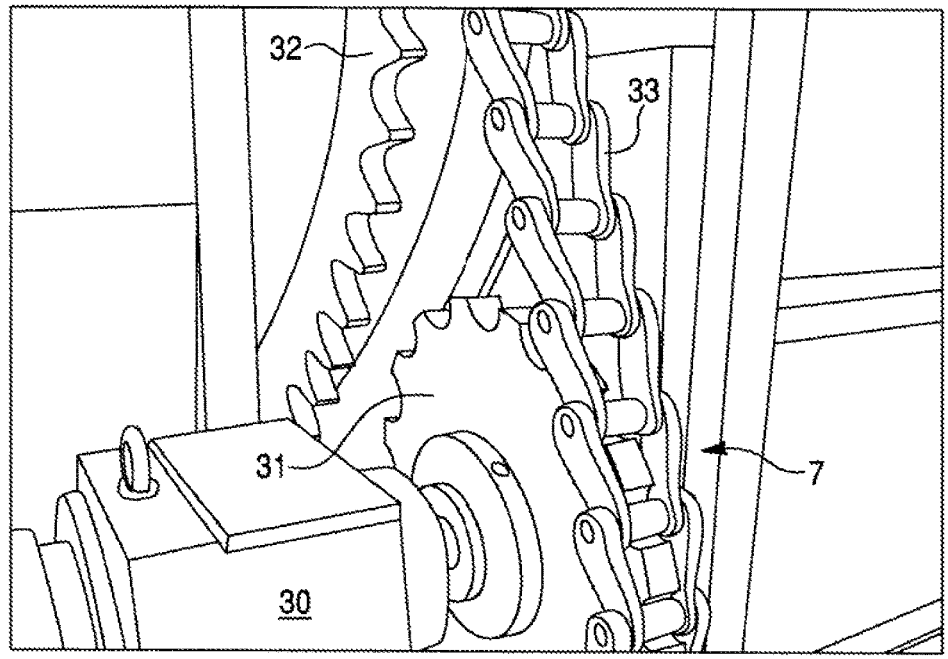
FIG. 9 is a close up view of the drive assembly of FIG. 8.
Figure 10:
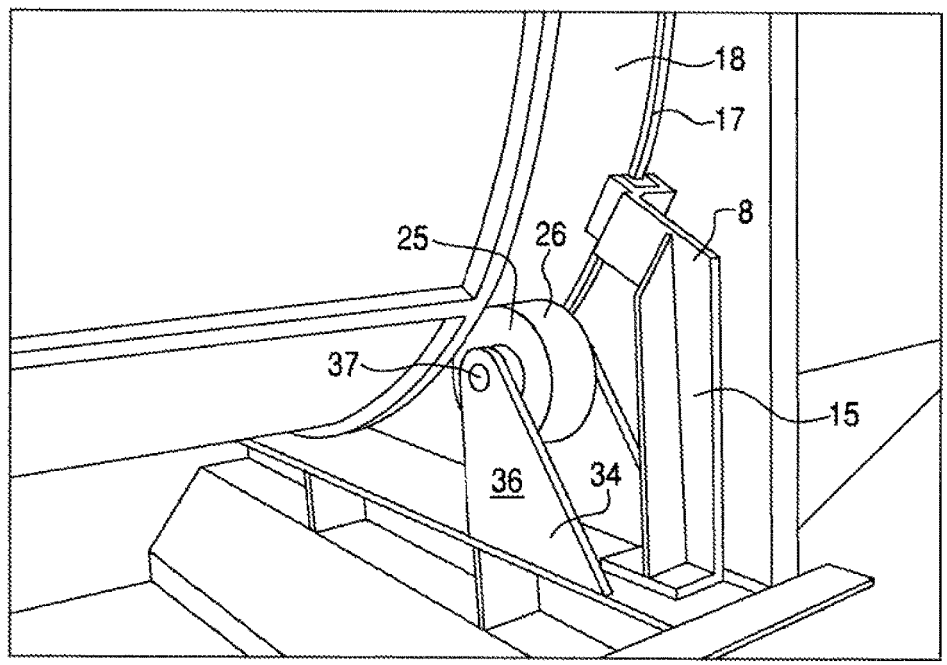
Figure 13:
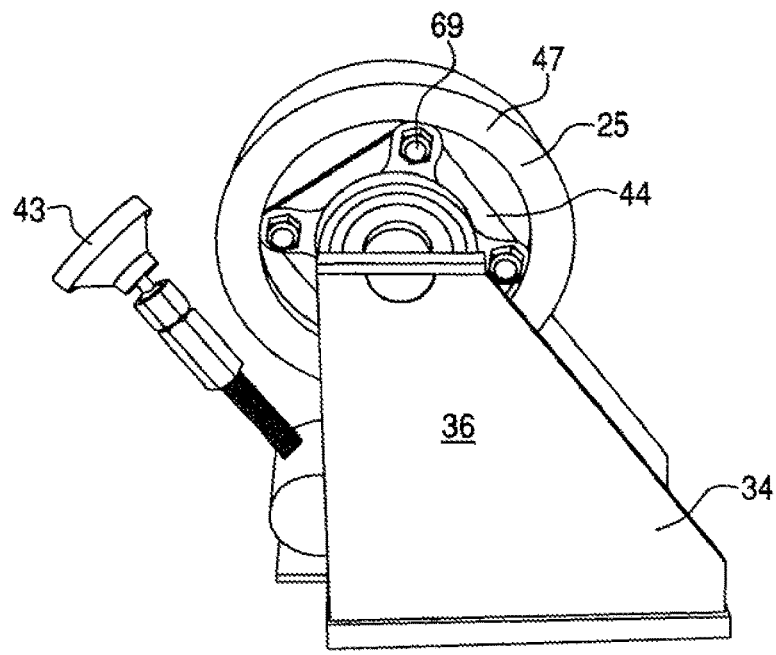
FIG. 13 is a view of a trunnion wheel according to one embodiment of the present invention.

FIGS. 1-2 show a pumped or gravity flow rotating drum screen for removing unwanted solids from a flowing fluid according to one embodiment of the present invention. Such a device may be used in many different applications, such as (but not limited to) the industries of pulp and paper, municipal sewage treatment, meat and poultry, citrus fruit, seafood processing, other food processing, beverage processing, plastic recycling and chemical processing. The drum screen may comprise a housing 1, a drive system 7 (FIG. 9) and one or more stabilization pad assemblies 8 (FIG. 10).

Figure 17:
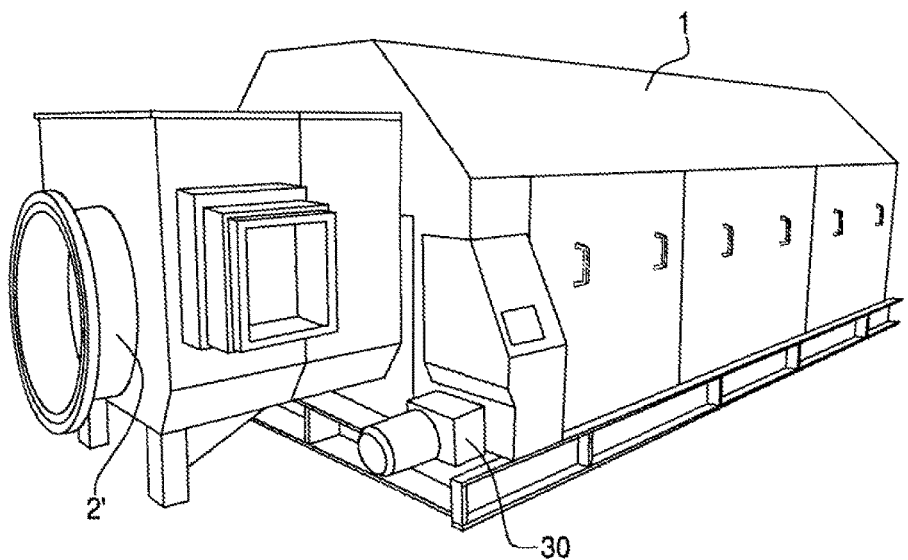
FIG. 17 is an inlet end view of a pumped or gravity flow rotating drum screen according to another embodiment of the present invention.

The housing 1 may have a fluid inlet end 2, a solid discharge end 3 and an area 4 between the two ends 2 and 3. The fluid inlet 2' at the fluid inlet end 2 permits a flow of influent containing unwanted solids into a hollow portion of a drum screen 5 positioned lengthwise in the area 4 between the two ends 2 and 3 of the housing 1. As seen in the embodiment of FIG. 1 and the embodiment of FIG. 17, the fluid inlet 2' may be a flanged passage for connection to a fluid source containing unwanted solids. The housing 1 may be placed on an elevated support structure 60 as seen in FIG. 1 or closer to the floor as seen in FIG. 17.

The drum screen 5 may comprise a filter medium that retains at least a portion of the unwanted solids within the hollow portion of the drum screen 5. This retention produces a liquid effluent that is discharged from an outer surface of the drum screen 5. The liquid effluent then may exit out a liquid outlet 6 into a drain pan, or the liquid effluent can fall into a concrete channel, which may be located at a bottom of the housing 1 below the drum screen 5. The liquid outlet may be connected to a liquid channeling system, such as drainage or sewage pipes, or to another system for further processing or treatment of the liquid effluent.

Figure 19:
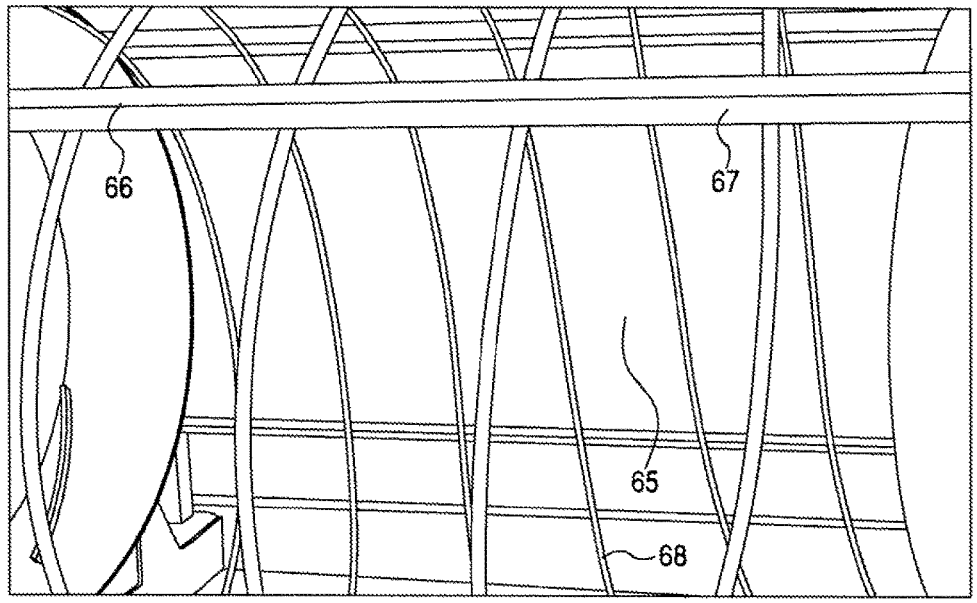
FIGS. 19 and 20 are views showing the mounting of a panel of filter medium on a supporting structure to form a drum screen according to an embodiment of the present invention.
Figure 20:
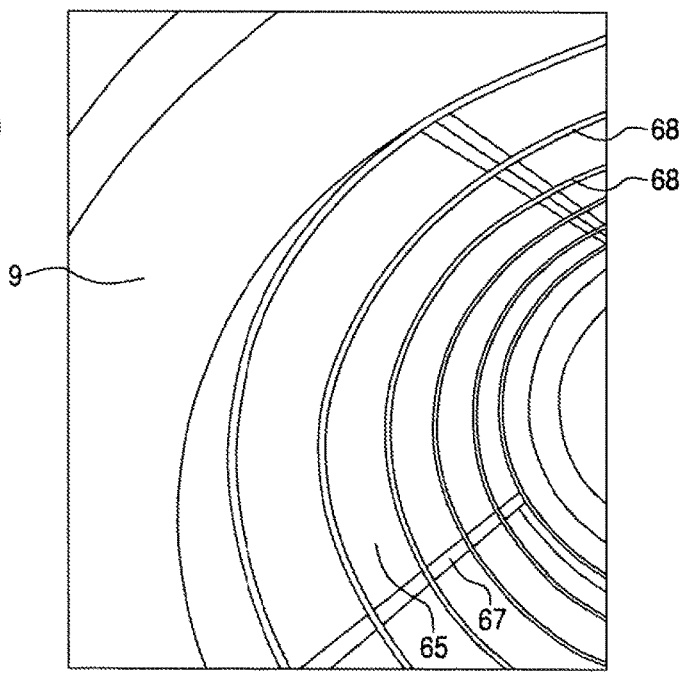

The drum screen 5 may take any suitable shape. For example, the drum screen may be a hollow cylinder or other suitable shape such as a hollow tubular shape with a cross sectional shape of a hexagon, octagon, or any other suitable polygon. The shape of the drum screen may be formed, for example, by applying panels 65 of filter medium are affixed to an internal support structure 66 comprising, for example, a mixture of curved members 68 and cross members 67, as seen in FIGS. 19 and 20.

Figure 3:
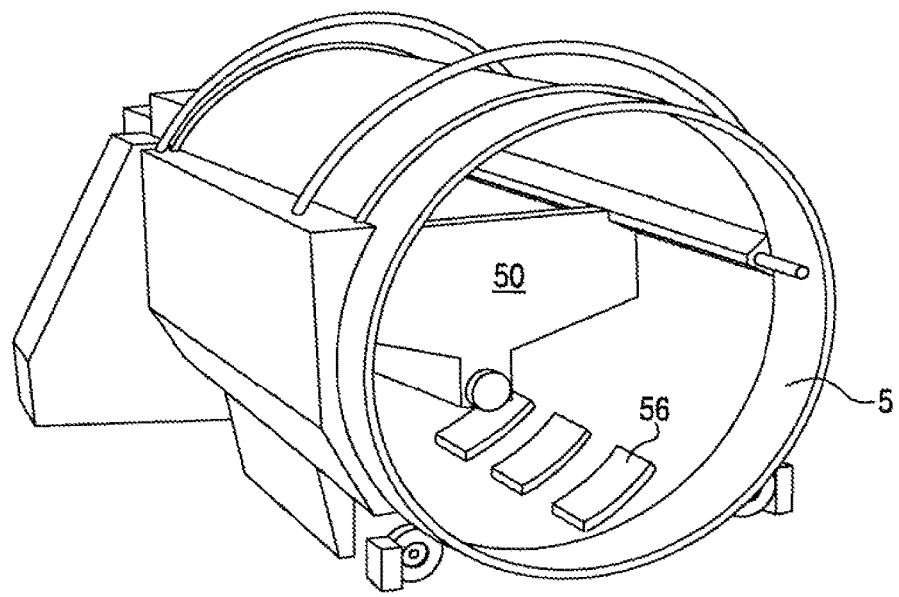
FIG. 3 is a discharge end of the drum screen according to one embodiment of the present invention.
Figure 4:
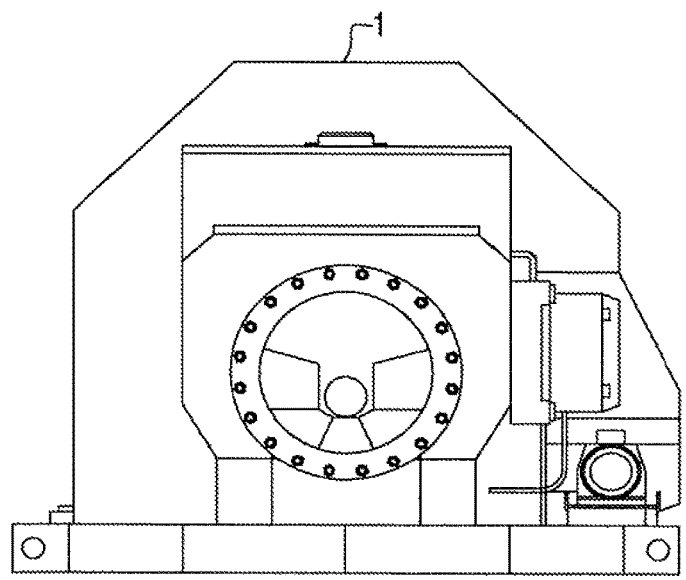
FIG. 4 is a pictorial view of the inlet side of the pumped or gravity flow rotating drum screen according to one embodiment of the present invention.
Figure 7A:
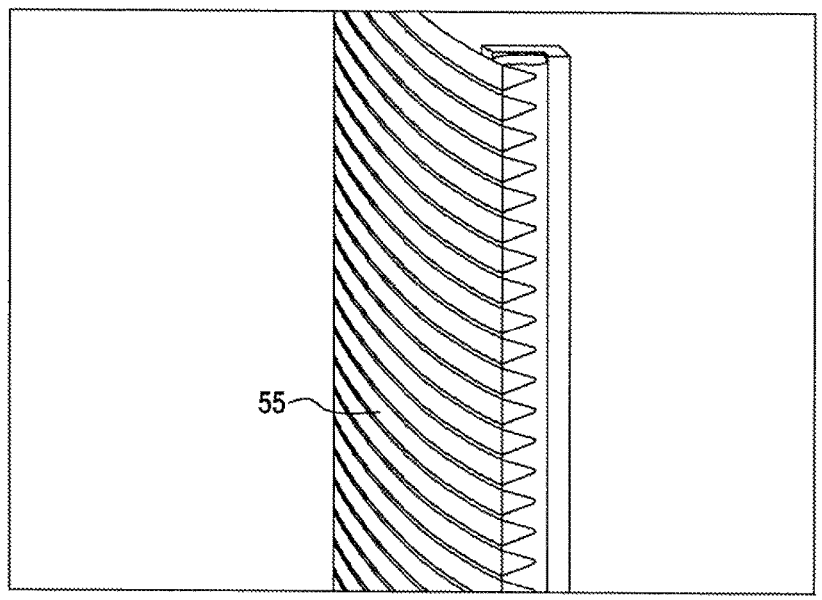
FIGS. 7a-7c are close up views of the materials for the screen media of the drum screen according to several embodiments of the present invention.
Figure 7B:
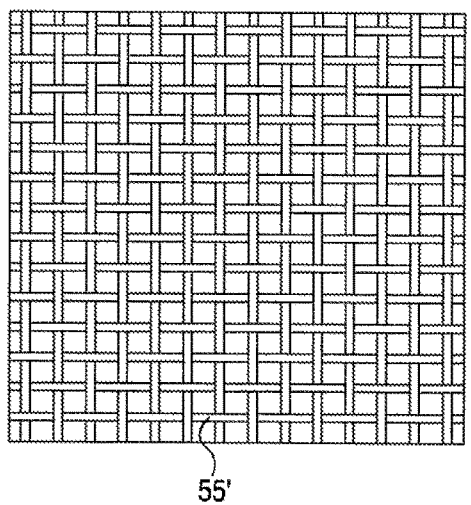
Figure 7C:
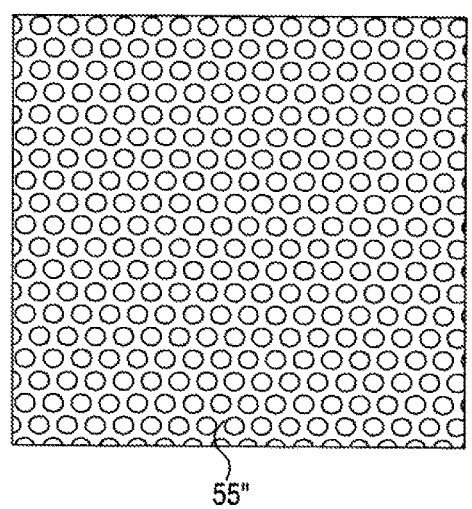

The screen may be made of any suitable filter medium such as 304 stainless steel wedgewire 55 (seen in FIG. 7a), and/or polymeric or metallic woven wire mesh 55' (seen in FIG. 7b) and/or polymeric or metallic perforated panels 55" (as shown in FIG. 7c) but any suitable screening material may be used. The pore size of the screens may also vary in size such as from about 1" to about 1/10,000". As seen in FIG. 3, the drum screen 5 may have angled flights 56 on an inner surface of the drum screen so as to direct the solids to the discharge area. The flights may be intermittent or continuous.

Optionally, exterior and internal spray bars may be used to keep the screen clean.

One or more rings 9 may circumscribe the outer surface of the drum screen 5. The rings 9 may include one or more rims 17 on either end of the ring so as to form a track into which the trunnion wheel 25 (to be described below) will rotate.

Inside the housing 1 is a headbox 50 is placed within the drum screen 5 and receives the influent from the fluid inlet 2'. Optionally, a baffled stilling chamber may be interposed between the fluid inlet 2' and the headbox 50 so as to reduce turbulence. The headbox 50 is configured to keep the unwanted solids in suspension and distribute flow evenly to the drum screen 5. The headbox 50 has sidewalls 51 that protrude up from a bottom 52. Some of the side walls 51, such as, for example two on either side of the headbox 50, have weirs 53. The influent overflows the weirs 53 on both sides and falls on the drum screen 5.

Figure 8:
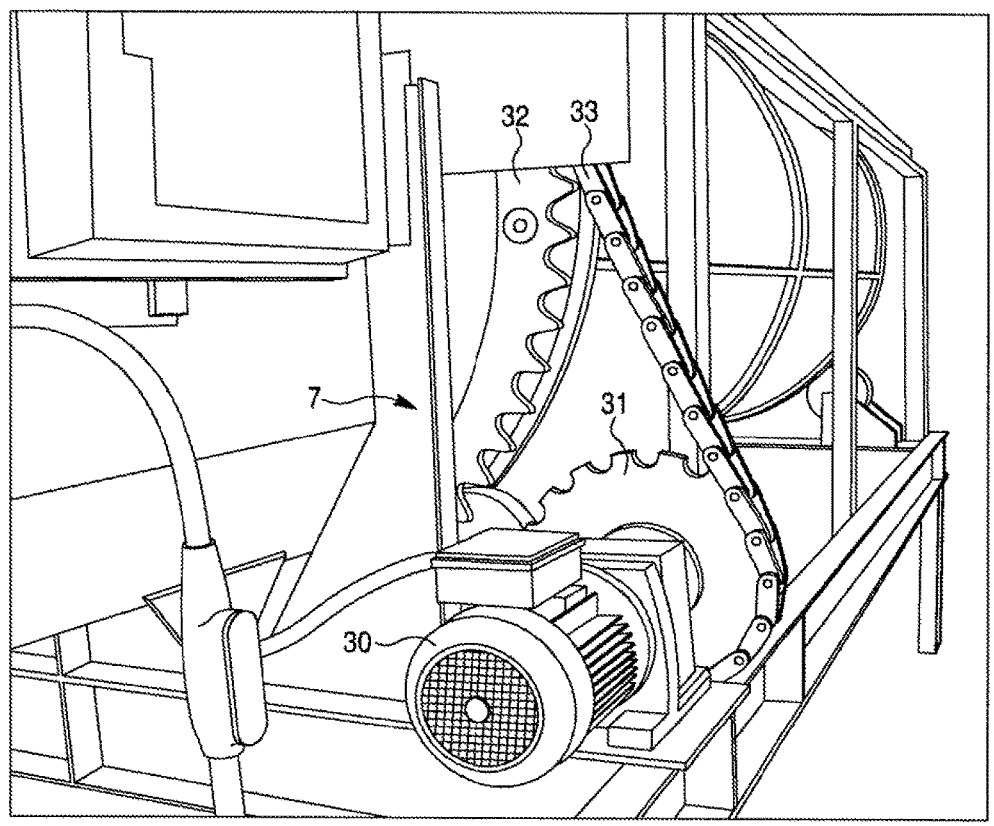
FIG. 8 is a view of the drive assembly according to one embodiment of the present invention.

The drive assembly 7 (shown in FIGS. 8-9) is configured to rotate the drum screen 5 about an axis A (shown in FIGS. 5 and 6) running the length of the drum screen 5.

The solids retained in the drum screen 5 may be removable from the drum screen 5 via the solid discharge end 3.

In a general sense, during operation, influent enters the fluid inlet 2' and enters into the headbox 50. The fluid then pours over the weirs 53 of the headbox 50 and the water and solids impinge on the rotating drum screen 5. The screen media from the drum screen 5 separates the liquid and solids inside the rotating drum screen 5. The solids are captured by the drum screen 5 while the liquid flows right through. Solids that can be separated by this process may include, for example, particulates, fats, oils, grease, and other unwanted solid waste products. The first two thirds of the drum screen 5 is typically wetted by the incoming influent, but the last third of the screen 5 is a drying zone for further draining of the solids. This ratio may change depending on the application to infinite other ratios. The effluent is discharged from an outer surface of the drum screen 5 with the retained solids being removable via the solid discharge end 3.

The drive assembly 7 comprises a drive motor 30, a drive sprocket 31 fixedly attached to the drive motor 30, a driven sprocket 32 fixedly attached to the drum screen 5, and a chain 33 connecting the drive sprocket 31 and the driven sprocket 32. The drive motor 30 may be, for example, an electric motor that will rotate the drive sprocket 31. The chain 33 will transfer the required power to the driven sprocket 32. The driven sprocket 32 will be attached to the drum screen 5 (by bolts, welds, or any other suitable fastening mechanism), which will cause the drum screen 5 to rotate. The driven sprocket, chain, and drive sprocket can typically be, for example, carbon steel, stainless steel, other metals, or any other suitable material.

According to another embodiment of the present invention, at least one of the drive sprocket 31, the driven sprocket 32, and the chain 33 comprises a synthetic polymer. According to further embodiment of the present invention all of the drive sprocket 31, the driven sprocket 32, and the chain 33 comprise a synthetic polymer. A synthetic polymer chain may utilize stainless steel wraps on the links of the chain. By way of explanation, during operation of the drive assembly 7, metallic cogs (such as the drive and driven sprockets and chain) require daily oil and/or grease lubrication because of the very high friction coefficient. If this lubrication is not provided, erosion wears the components rapidly, causing premature failures. Unlike metallic components, the polymeric components reduce the friction coefficient (or wear factor) to eliminate severe erosion between the coupled components. So using these polymeric components, the need for any type of lubrication is greatly reduced, if not eliminated. Furthermore, corrosion is also common in many water and wastewater applications and the polymeric material for the drive sprocket 31, the driven sprocket 32, and the chain 33 would be less susceptible to corrosion than the metallic versions in carbon or stainless steel.

Furthermore, if there is a need to have the housing 1 completely enclose the screen drum 5 such that there are fewer gaps in the housing, for example, in applications where corrosive gases are present (for example, in sewage treatment plants). The corrosive gases inside the enclosure may increase corrosion of non stainless components and stainless metallic (such as the drive sprocket 31, the driven sprocket 32, and the chain 33 if they are made of carbon steel). Corrosion may occurs because acids are formed in the wet environment and which attack metals. Erosion may occur because of the lack of lubrication on the components, which is a concern as municipalities all over the USA have decreased their headcount, and therefore have fewer operators to maintain equipment as compared to 10-20 years ago. It is possible that the combination of corrosion and erosion may wear out these items in 3 to 6 months. The use of polymers for the drive sprocket 31, the driven sprocket 32, and the chain 33 will extend their life over their metallic counterparts.

Although any suitable polymeric material may be used for the drive sprocket 31, the driven sprocket 32, and the chain 33, a preferred polymeric material is nylon for the drive sprocket, polyethylene for the driven sprocket, and nylon for the chain. More preferably, the drive sprocket 31 may comprise (but is not limited to) NH-78 type Nylon-6, the driven sprocket 32 may comprise (but is not limited to) NH-78 type ultra-high-molecular-weight polyethylene (UHMW PE), and the chain may comprise (but is not limited to) NH-78 type Nylon-6 or NH-78 type Nylon-6 with stainless steel wraps around the links. The benefits that may be obtained if such material are used for the drive sprocket 31, the driven sprocket 32, and the chain 33 may include savings of up to about 70 hours per year of labor for work on replacement and repair. Thus, the drive sprocket 31, the driven sprocket 32, and the chain 33 can achieve longer life without the requirement of lubrication.

The one or more stabilization pad assemblies 8 in contact with the one or more rings 9 circumscribing the outer surface of the drum screen 5 may be at one or more locations substantially removed from the bottom most portion of the drum screen 5. The one or more stabilization pad assemblies 8 inhibit a movement of the drum screen in a direction in line with or parallel to the axis A running along the length of the drum screen 5.

One or more locations that are substantially removed from the bottom most portion of the drum screen 5 may include one or more locations that fall below a horizontal plane B that is substantially parallel to a floor 63 and which divides the drum screen 5 into a bottom portion (comprising volumes 11 and 12 in FIGS. 18*a* and 18*b*) and a top portion (comprising volume 10) of equal volumes.

Also, the one or more locations that are substantially removed from the bottom most portion of the drum screen 5 may include one or more locations that fall below a horizontal plane D that is substantially parallel to the floor 63 and which divides the drum screen 5 into a bottom portion 11' and a top portion 10', as seen in FIGS. 18*c* and 18*d*. The volume of the bottom portion 11' may range from about 15% to less than about 75% of the volume of the entire drum screen 5, preferably ranging from about 20% to about 50%.

Also, the one or more locations that are substantially removed from the bottom most portion of the drum screen 5 may include one or more locations that fall in a vicinity of a horizontal plane C that is substantially parallel to the floor 63 and cuts a cross section of the drum screen 5 at about the 4 o'clock position E and 8 o'clock position F.

According to alternative embodiments, the one or more locations that are substantially removed from the bottom most portion of the drum screen 5 may include one or more locations that fall in a vicinity of a horizontal plane that is substantially parallel to the floor 63 and which divides the drum screen 5 into a bottom portion and a top portion in which the volume of the bottom portion may range from about 15% to about 75%, preferably from about 20% to about 50%, such as any integer between 15% to 75%.

The number of stabilization pad assemblies 8 in the screen drum 5 may be one, two, three, four, or more. For example, making reference to FIGS. 5 and 6, there can be a stabilization pad assembly 8 in any one, two, three, or four of the following areas: the area H, the area G, the area I corresponding to the area H at the inlet end 2 of the screen drum, and the area J corresponding to the area G at the inlet end 2 of the screen drum.

Furthermore, as seen in FIGS. 10 and 11, the stabilization pad assembly 8 and the trunnion wheel 25 (to be described in detail below) are mounted on the housing 1 such that the pad portion 16 of the stabilization pad assembly 8 is positioned at a height, which is above the top most portion 26 of the trunnion wheel 25.

FIGS. 10 and 11 show a stabilization pad assembly 8 according to an embodiment of the present invention. Each stabilization pad assembly 8 may include a mountable bracket 15 to which a pad 16 is affixed.

The pad 16 may be U-shaped in cross section. One of the rims 17 of the ring 9 rotates through the U-shape of the pad 16. Typically, the pad 16 may be made of UHMW PE. However, according to another embodiment of the present invention, the pad 16 may a lubricating polymer. To provide an example, the pad 16 continuously rubs against the drum screen. If UHMW PE is used as the material of the pad 16, the continuous rubbing from the drum screen creates friction which causes wear and heat creation. To reduce the effect of the rubbing of the stabilizer pads 16, they can be daily lubricated with grease. However, according to another embodiment of the present invention, the material of the pad 16 may be Xylethon made by the Durawear Corporation of Birmingham, Ala. This material is a self lubricating polymer which eliminates, or at least greatly reduces, the need for grease lubrication. Of course, other lubricating polymers may be used as well.

The bracket 15 includes a base portion 18 that mounts to a supporting structure 24 of the housing 1 The bracket may be attached to the supporting structure 24 by any suitable fastening mechanism, such as bolts 19, welds, clamps, or the like. Protruding up from the base portion 18 is an upstanding member 20. The upstanding member 20 may be any suitable shape. In FIG. 11, the upstanding member 20 may have an L-shaped portion having sides 21' and 21" and a slanted portion 21''' which leans towards the rim 17 of the ring member 9. The sides 21' and 21" and the slanted portion 21''' may be bolted together, welded together, formed as one integral unit, or attached to each other in any known fashion. Attached to the slanted portion 21''' is a holding portion 23 into which the pad 16 is inserted. The pad 16, the holding portion 23, and the upstanding portion 20 may be fastened together using one or more bolts or the pad may be fixed to the holding portion 23 in any known suitable fashion, for example, by clamping, by adhesive, or by mechanical fasteners or the like.

Figure 5:
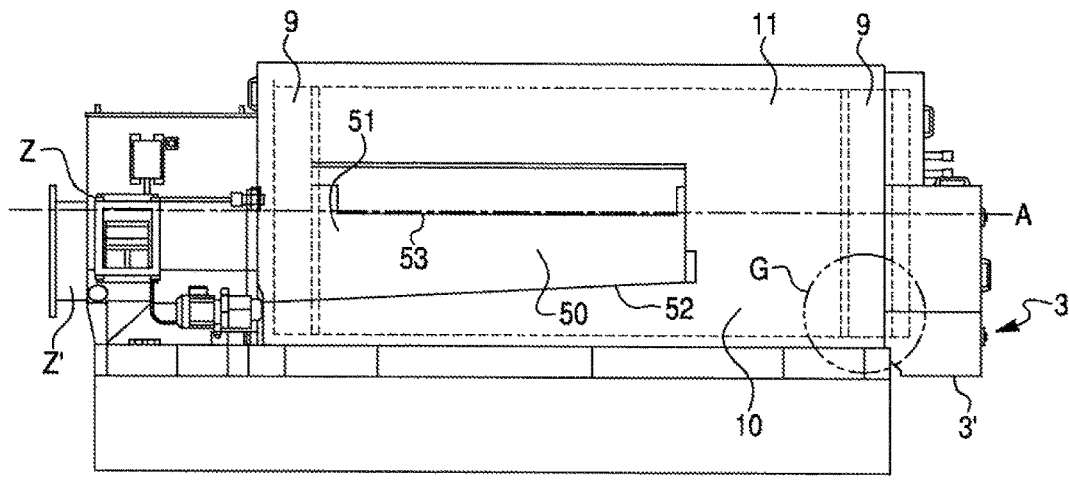
FIG. 5 is a pictorial view of the side of the pumped flow rotating drum screen of FIG. 4.
Figure 6:
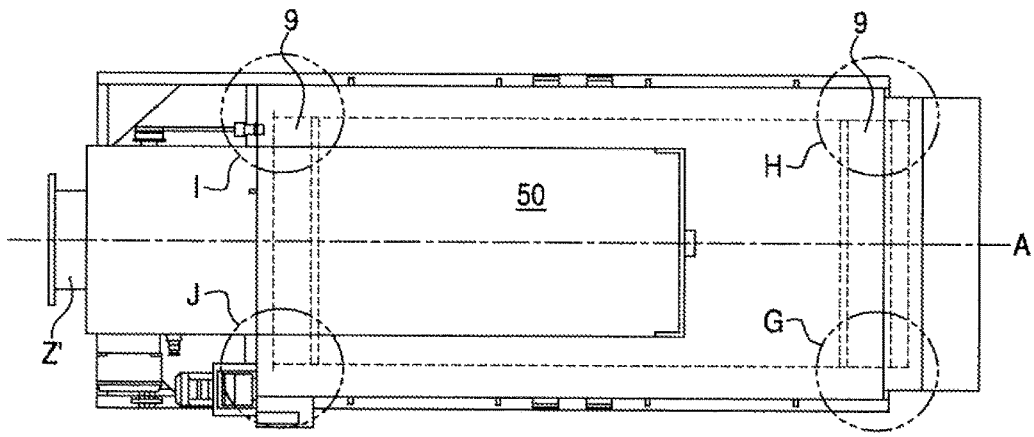
FIG. 6 is a pictorial view of the top of the pumped flow rotating drum screen of FIG. 4.

The one or more stabilization pad assemblies 8 are mounted towards the solid discharge end 3 or the fluid inlet end 2 of the housing 1. For example, the stabilization pad assemblies 8 may be located at the rim 17 of the ring 9 located at the discharge end 3 of the housing 3 at area G or area H, as seen in FIGS. 5 and 6.

With the stabilization pad assemblies 8 thus described, the advantages of such an assembly will now be explained. The drum screen is continuously rotated in a radial direction, but the drum screen 5 should not move more than +/−⅛" in the direction of the axis A running the length of the drum screen 5 to operate correctly. The stabilization pad assemblies limit this movement by applying forces in the opposite direction of the drum screen's axial movement by rubbing. Other stabilization pads have been located under the screen drum 5 at a 6 o'clock position, such as the pad assembly 27 in FIG. 12. This location can be hard to inspect or reach after the drum screen is installed. For example, the operator would need to kneel to the ground to view the stabilization pad assembly 27. Also, the operator is far away from the pad (may be up to minimum 35") when they need to reach it. Furthermore, there are also other obstacles such as drive components (such as the chain 28 and the driven sprocket 29) and the drum screen itself. All of these items make it troublesome to reach the stabilization pad assembly 27. It has been discovered that, by placing the stabilization pad assemblies 8 at the location substantially removed from the bottom most portion of the drum screen 5 will allow for easier access and inspection.

Additional benefits may be obtained if a lubricating polymer is used as the material for the pad 16. For example, when Xylethon is used as the material for the pad 16, the savings may be up to about 90 hours per year of labor for work related to replacement or repair. Thus, the stabilization pad assembly can achieve longer life without the requirement of lubrication.

FIGS. 2, 10, 11, and 13 show trunnion wheels 25 used according to embodiments of the present invention. A plurality of trunnion wheels 25 are configured to engage the drum screen 5 as the drum screen rotates 5. The trunnion wheels 25 run between the rims 17 of the ring 9. Each trunnion wheel 25 is affixed to a shaft 35 that protrudes a distance from both faces of the trunnion wheel 25.

Figure 15:
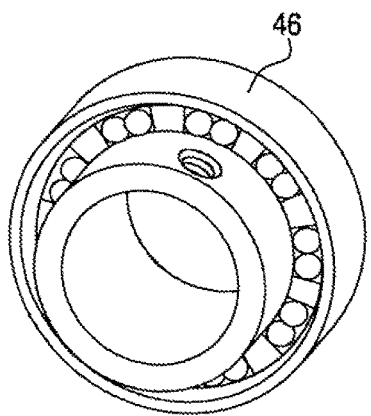
FIG. 15 is a view of a bearing insert used for permitting rotation of the trunnion wheel according to an embodiment of the present invention.
Figure 23:
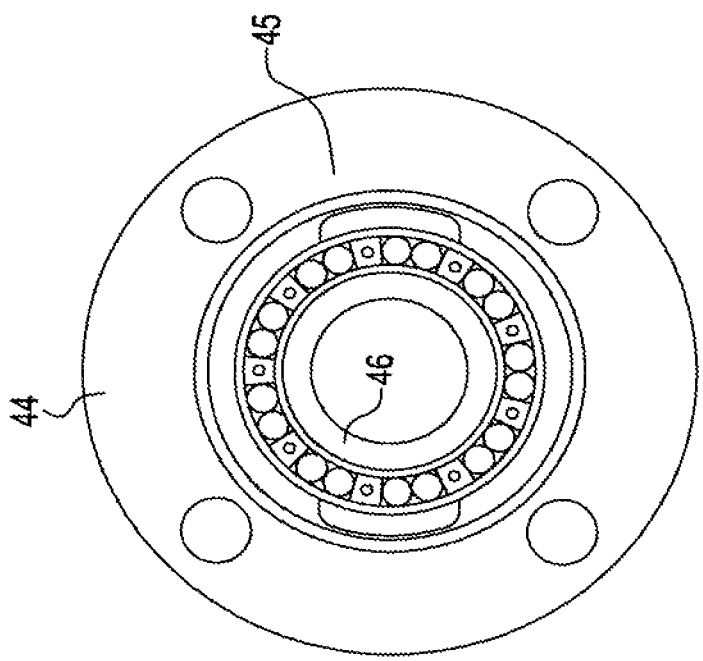
FIG. 23 is a front view of the flanged bearing and bearing insert of the trunnion wheel according to one embodiment of the present invention.

According to one embodiment of the present invention, the trunnion wheel 25 may comprise at least one flanged bearing 44 (as shown in FIG. 23), preferably two flanged bearings. The flanged bearing 44 may be made of an epoxy coated housing flange 45 and a carbon steel bearing insert 46 (in FIGS. 15 and 23) which grasps a wheel 47 from both sides via bolts 69 (in FIG. 13). The wheel 47 may be, for example, made from UHMW PE, acetyl, Teflon, and any other similar polymeric and/or metallic material.

Figure 16:
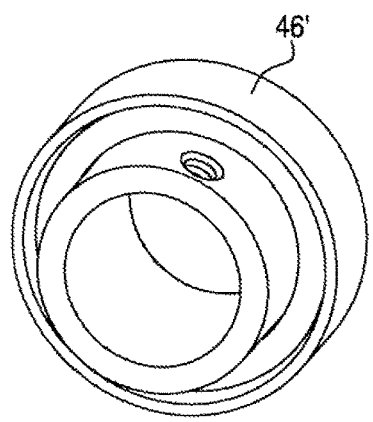
FIG. 16 is a view of a bearing insert used for permitting rotation of the trunnion wheel according to another embodiment of the present invention.
Figure 21:
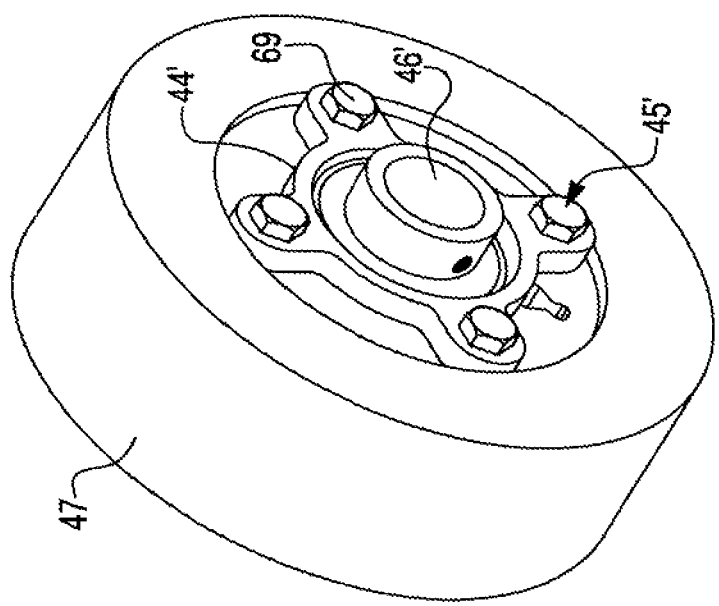
FIGS. 21 and 22 are perspective and side views, respectively, of an assembly of the wheel, flanged bearing, and bearing insert for the trunnion wheel according to one embodiment of the present invention.
Figure 22:
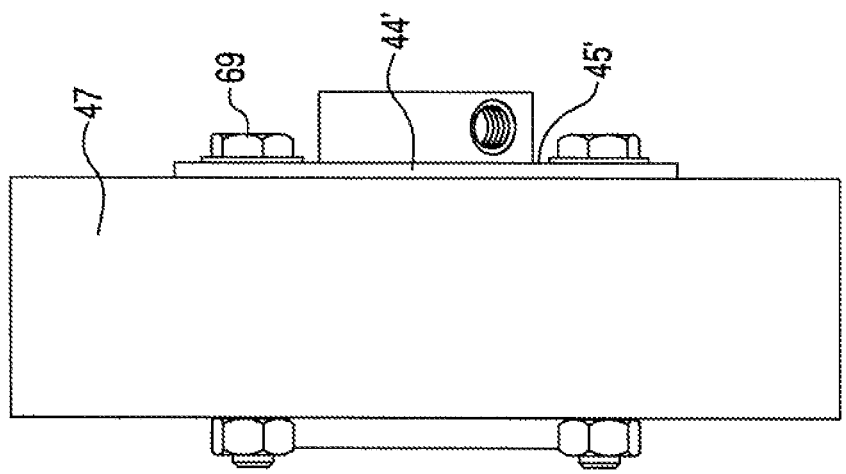
Figure 24:
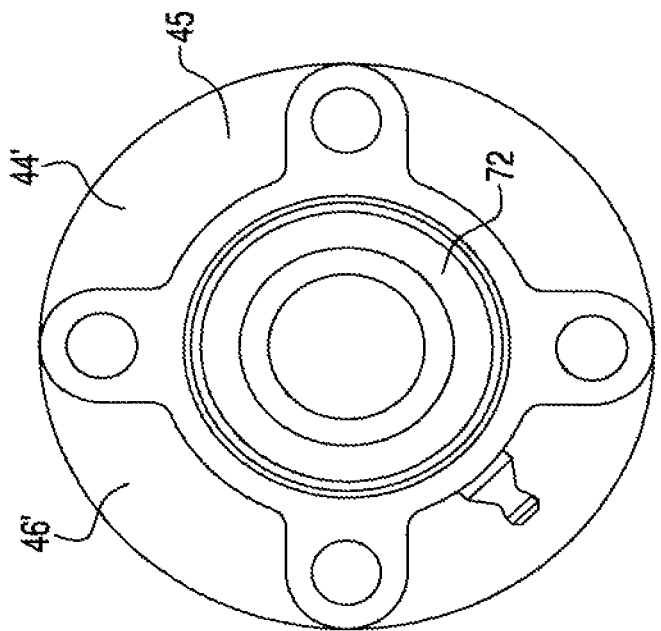
FIG. 24 is a front view of the flanged bearing and bearing insert for the assembly of FIGS. 21 and 22.

According to another embodiment of the present invention, the housing flange 45' of the flanged bearing 44' may have anti-corrosive plating, such as nickel plating, and the bearing inserts 46' (in FIGS. 16 and 24) may be made of stainless steel for use in corrosive environments where carbon steel inserts may corrode more rapidly. The wheel 47 can still be made from, for example, UHMW PE, acetyl, Teflon, and any other similar polymeric and/or metallic material. The wheel assembly may then comprise at least one, preferably two, flanged bearings 44' around the wheel 47 with a hole pattern that matches the flanged bearing's hole pattern. The bearings 44' will be coupled from the two sides of the wheel 47, holding it in place using bolts 69 (in FIGS. 21 and 22).

Furthermore, the at least one flanged bearing can be self-lubricating as the bearing rotates. For self-lubrication, the at least one flanged bearing comprises a polymer component 72 containing oil for self-lubrication. For example, the polymeric lubrication system MicroPoly by Phymet Industries can be used in the trunnion wheels 25 so as to greatly reduce, if not eliminate, daily lubrication for waste water and water treatment applications. This technology may been used, thus greatly reducing, if not eliminating, the need for daily lubrication of bearings while it also acts as an additional seal and protection for the bearings. The technology comprises a polymeric component which contains oil inside its molecules and releases the oil as the bearing rotates. The bearings can utilize lubricant, such as, for example, the PhyMet™, MPF-0696, MPI-0800, MPI-2000, or MPI-2400, or the like, without limitation, which contains corrosion inhibitors, antioxidants and wear/friction reducing additives. Such lubricant may be used on all moving parts to reduce friction, prevent wear of components, reduce heat build-up, and reduce power consumption.

The benefits that may be obtained if such materials are used in the wheel assembly may include savings up to about 200 hours per year of labor for replacement and repair work. Thus, the wheel assembly can achieve longer life without the requirement of lubrication.

Each trunnion wheel 25 is supported by a bracket 34 that is mounted to the housing. The bracket 34 comprises two substantially parallel side members 36 spaced apart at a distance not to exceed the distance between the ends of the trunnion wheel shaft protrusions. The parallel side members may have a base portion 39 and/or one or more cross members 40 which can maintain the side members parallel to each other. The side members, cross members, or base portion may be attached to each other in any suitable fashion, such as bolts, welding, or the like so as to form the bracket 34. As seen in FIG. 10, the shaft protrusions 35 are inserted into holes 37 in the side members 36. The shaft protrusion 35 can have a press fit. The wheel 25 spins about the shaft protrusions 35, while they sit in the bracket 34.

Figure 14:
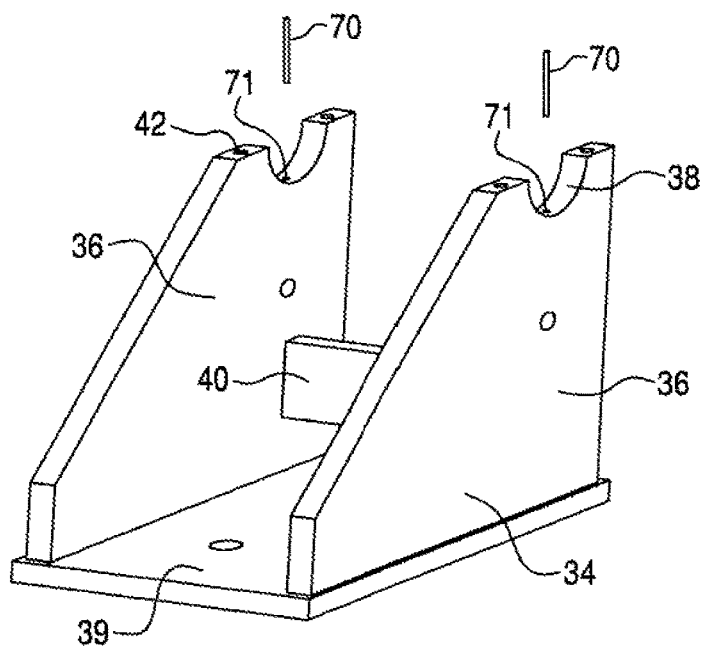
FIG. 14 is a view of a bracket for supporting the trunnion wheel of FIG. 13.

According to another embodiment of the present invention, the tops of the side members 36 are notched to provide a pair of semicircular spaces 38 in which the trunnion wheel shaft protrusions 35 are seated, as seen in FIG. 14. The shaft protrusion 35 may be prevented from rotating through the use of a removable strip or cover 41 that can be affixed to the side members 36 by screw holes 42 and/or by using pins 70 that are inserted into holes 71 in the semicircular spaces where the wheels shafts sits on these pins. With the embodiment having the holes 37, an operator would need something to jack up the screen drum 5 in order to remove the complete trunnion wheel assembly (that is the trunnion wheel 25 and the bracket 34), press the trunnion wheel shaft protrusion 35 out of the bracket 34, and install the new wheel. This procedure may take one person half a day to perform. With the embodiment with the notches, the operator merely lifts the drum screen 5 with a jacking tool 43 and replaces the trunnion wheel 25, which may take about half an hour for one person. Thus, savings in the time to replace or repair the trunnion wheel 25 can be effected.

Now three examples will be provided to show the savings that can be realized with various features of the present invention.

Example A

A drum screen equipped with the feature of the trunnion wheel assembly described herein was tested to determine its maintenance free characteristics compared with an apparatus not so equipped. The results were as follows:

|  | Water Treated before any maintenance | Yearly Labor Requirement | Yearly Labor Cost |
|---|---|---|---|
| Existing Design | 3 Million Gallons | 214.5 hours | $6435 |
| Improved Design | 927 million gallons | 8 hours | $240 |

Example B

A drum screen equipped with the feature of the drive assembly described herein was tested to determine its maintenance free characteristics compared with an apparatus not so equipped. The results were as follows:

|  | Water Treated before any maintenance | Yearly Labor Requirement | Yearly Labor Cost |
|---|---|---|---|
| Existing Design | 3 Million Gallons | 76 hours | $2280 |
| Improved Design | 780 million gallons | 0 hours | $0 |

Example C

A drum screen equipped with the feature of the stabilization pad assemblies described herein was tested to determine its maintenance free characteristics compared with an apparatus not so equipped. The results were as follows:

|  | Water Treated before any maintenance | Yearly Labor Requirement | Yearly Labor Cost |
|---|---|---|---|
| Existing Design | 3 Million Gallons | 91.25 hours | $2,737.5 |
| Improved Design | 1290 million gallons | 0 hours | $0 |

At the time of test, the improved system did not have any failures or maintenance after 1 year 2 months 5 days=430 days Besides those embodiments depicted in the figures and described in the above description, other embodiments of the present invention are also contemplated. For example, any single feature of one embodiment of the present invention may be used in any other embodiment of the present invention. For example, the apparatus and/or method may comprise any of the following features in any combination:
  (1) a housing having a fluid inlet end, a solid discharge end and an area between the two ends, the fluid inlet permitting a flow of influent containing unwanted solids into a hollow portion of a drum screen positioned lengthwise in the area between the two ends of the housing, the screen comprising a filter medium that retains at least a portion of the unwanted solids within the hollow portion of the drum screen and which produces a liquid effluent that is discharged from an outer surface of the drum screen, the retained solids being removable via the solid discharge end;
  (2) a drive assembly configured to rotate the drum screen about an axis running the length of the drum screen;
  (3) one or more stabilization pad assemblies in contact with one or more rings circumscribing the outer surface of the drum screen at one or more locations substantially removed from the bottom most portion of the drum screen;
  (4) the one or more stabilization pad assemblies inhibit a movement of the drum screen in a direction in line with or parallel to the axis running the length of the drum screen;
  (5) the one or more locations fall below a horizontal plane that is substantially parallel to a floor and which divides the drum screen into a bottom portion and a top portion of equal volumes;
  (6) the one or more locations fall below a horizontal plane that is substantially parallel to a floor and which divides the drum screen into a bottom portion and a top portion, the volume of the bottom portion ranging from about 15% to less than about 75% of the volume of the entire drum screen or ranging from about 20% to about 50%;
  (7) each stabilization pad assembly includes a mountable bracket to which a pad is affixed;
  (8) each stabilization pad assembly includes a mountable bracket to which a pad is affixed, the pad comprising a lubricating polymer;
  (9) the one or more stabilization pad assemblies are mounted towards the solid discharge end or the fluid inlet end of the housing;
  (10) the drive assembly comprises a drive motor, a drive sprocket fixedly attached to the drive motor, a driven sprocket fixedly attached to the drum screen, and a chain connecting the drive sprocket and the driven sprocket;
  (11) at least one of the drive sprocket, the driven sprocket, and the chain comprises a synthetic polymer;
  (12) the drive sprocket, the driven sprocket, and the chain comprise a synthetic polymer or any combination or metallic, non-metallic, polymeric, composite and hybrid materials for each item;
  (13) the drive sprocket comprises nylon, the driven sprocket comprises polyethylene, and the chain comprises nylon;
  (14) a plurality of trunnion wheels configured to engage the drum screen as the drum screen rotates, each trunnion wheel affixed to a fixed shaft that protrudes a distance from both faces of the trunnion wheel;
  (15) each trunnion wheel is supported by a bracket that is mounted to the housing, the bracket comprising two substantially parallel side members spaced apart at a distance not to exceed the distance between the ends of the trunnion wheel shaft protrusions;
  (16) the tops of the side members are notched to provide a pair of semicircular spaces in which the trunnion shaft protrusions are seated;
  (17) the trunnion wheel further comprises a flanged bearing having anti-corrosive plating;
  (18) the anti-corrosive plating comprises nickel plating;
  (19) the at least one flanged bearing comprises two flanged bearings having anti-corrosive plating;
  (20) the at least one flanged bearing is self-lubricating as the bearing rotates; the at least one flanged bearing comprises a polymer component containing oil for self-lubrication;
  (21) the trunnion wheel further comprises a stainless steel bearing insert;
  (22) one or more stabilization pad assemblies in contact with one or more rings circumscribing the outer surface of the drum screen at one or more locations in an area of the discharge end;
  (23) the pad is positioned at one or more locations substantially removed from the bottom most portion of the drum screen and/or above the top of the trunnion wheel;
  (24) the pad comprises a lubricating polymer;
  (25) the stabilization pad assembly and the trunnion wheel are mounted on the housing such that the pad portion of the stabilization pad assembly is positioned at a height, which is above the top most portion of the trunnion wheel.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A method for removing solids from a flowing fluid using a pumped or gravity flow rotating drum screen, comprising:
    causing a flow of influent containing solids to enter a fluid inlet end of a housing, the housing being equipped with the fluid inlet end, a solid discharge end and an area between the two ends,
    wherein the influent flows into a hollow portion of a drum screen positioned lengthwise in the area between the two ends of the housing, the drum screen comprising a filter medium that retains at least a portion of the solids within the hollow portion of the drum screen and which produces a liquid effluent that is discharged from an outer surface of the drum screen, the retained solids being removable via the solid discharge end;
    rotating, by a drive assembly, the drum screen about an axis running the length of the drum screen;
    engaging, by a plurality of trunnion wheels, one or more rings circumscribing the outer surface of the drum screen as the drum screen rotates, in which each trunnion wheel is supported by a bracket mounted to the housing; and
    stabilizing the drum screen using one or more stationary stabilization pad assemblies comprising a mountable bracket including a base portion, an upstanding member, and a holding portion,
    mounting the base portion to a supporting structure of the housing such that the upstanding member protrudes up from the base portion, and the holding portion is attached to a top of the upstanding member,
    wherein the holding portion includes a U-shaped cross-section into which a pad is inserted,
    wherein one or more rims of the one or more rings is received within the holding portion such that the pad is in contact with the one or more rims, and
    wherein the holding portion is positioned above at least a portion of the drum screen and at least a portion of the plurality of trunnion wheels.

2. The method of claim 1, further comprising:
    inhibiting movement of the drum screen in a direction in line with or parallel to the axis running the length of the drum screen.

3. The method of claim 1, wherein the holding portion is disposed at a bottom portion of the drum screen which comprises about 15% to less than about 75% of the volume of the entire drum screen.

4. The method of claim 1, in which the pad comprises a lubricating polymer.

5. The method of claim 1, in which the one or more stabilization pad assemblies are mounted towards the solid discharge end, center of unit, or the fluid inlet end of the housing.

6. The method of claim 1, in which the drive assembly comprises a drive motor, a drive sprocket fixedly attached to the drive motor, a driven sprocket fixedly attached to the drum screen, and a chain connecting the drive sprocket and the driven sprocket.

7. The method of claim 6, in which at least one of the drive sprocket, the driven sprocket, and the chain comprises a synthetic polymer.

8. The method of claim 7, in which the drive sprocket comprises nylon, the driven sprocket comprises polyethylene, and the chain comprises nylon.

9. The method of claim 1, wherein each trunnion wheel is rotatably attached to a fixed shaft that protrudes a distance from both faces of the trunnion wheel.

10. The method of claim 1, in which the bracket comprises two substantially parallel side members spaced apart at a distance not exceeding the distance between ends of shaft protrusions of each trunnion wheel.

11. The method of claim 10, in which tops of the side members are notched to provide a pair of semicircular spaces in which the shaft protrusions are seated.

12. The method of claim 1, in which the plurality of trunnion wheels further comprises at least one flanged bearing having anti-corrosive plating.

13. The method of claim 12, in which the anti-corrosive plating comprises nickel plating.

14. The method of claim 12, in which the at least one flanged bearing comprises two flanged bearings having anti-corrosive plating.

15. The method of claim 12, comprising self-lubricating the at least one flanged bearing while the bearing rotates.

16. The method of claim 12, in which the at least one flanged bearing comprises a polymer component containing oil for self-lubrication.

17. The method of claim 1, in which at least one of the plurality of trunnion wheels further comprises a stainless steel bearing insert.

18. A method for removing solids from a flowing fluid, comprising:
    permitting a flow of influent containing solids into a hollow portion of a drum screen between an inlet end and a discharge end of a housing of the drum screen;
    retaining, in a filter, at least a portion of the solids within the hollow portion of the drum screen;
    discharging, from the discharge end, the portion of the solids retained in the filter;
    discharging liquid effluent from an outer surface of the drum screen;
    a drive assembly configured to rotate the drum screen about an axis running the length of the drum screen;
    engaging a portion on the outer surface of the drum screen while the drum screen rotates via at least one of a plurality of trunnions respectively provided with at least one of a plurality of trunnion wheels, at least one of the trunnion wheels being supported by a bracket mounted to the housing; and
    stabilizing the drum screen via one or more stabilization assemblies, at least one of the stabilization assemblies including a base portion, an upstanding member, and a holding portion,
    wherein the holding portion includes a U-shaped cross-section into which a pad is inserted, and
    wherein the holding portion is positioned at a location substantially above a bottommost portion of the drum screen in an area of the discharge end and above a topmost portion of the plurality of trunnion wheels.

* * * * *